United States Patent Office 3,101,813
Patented Aug. 27, 1963

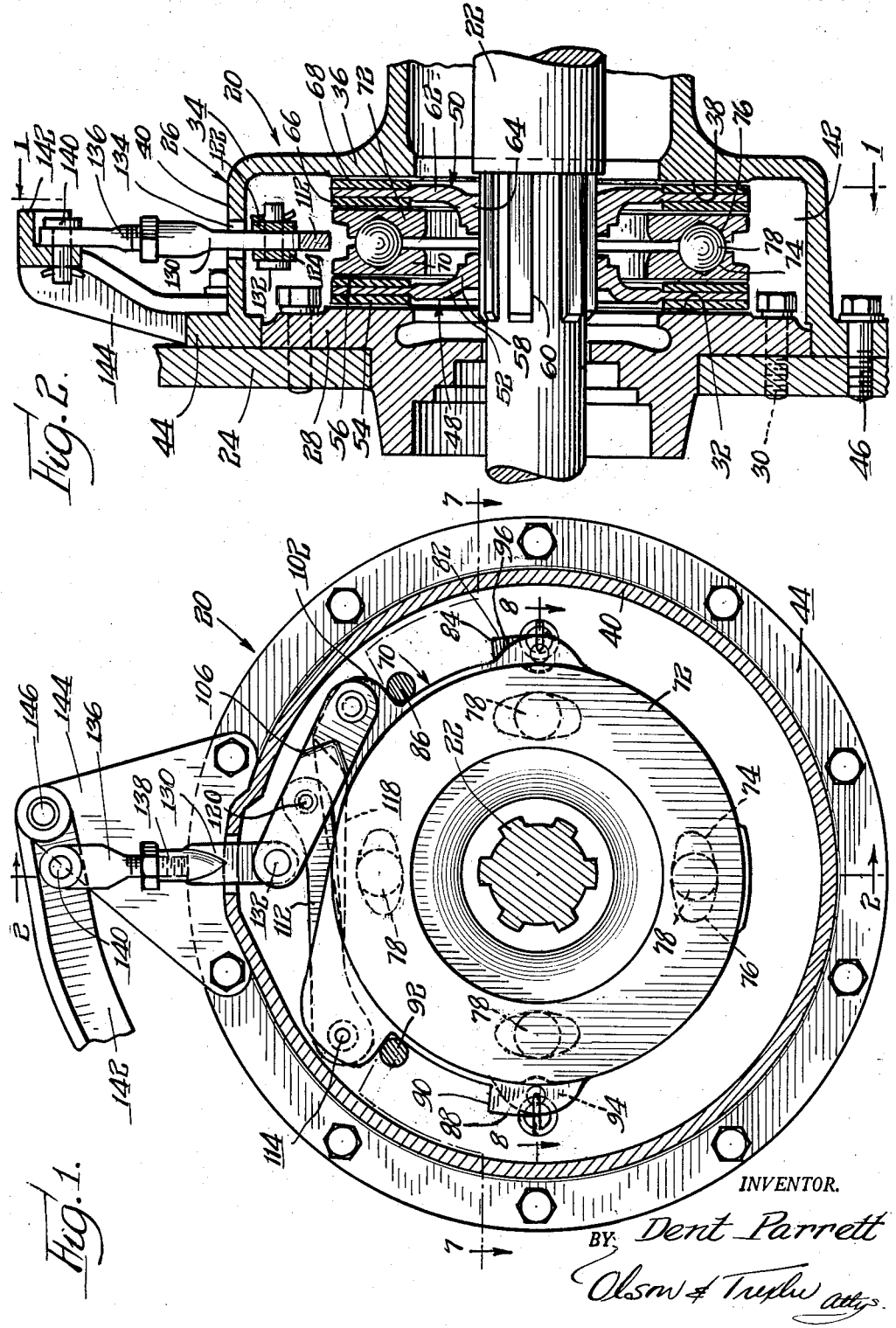

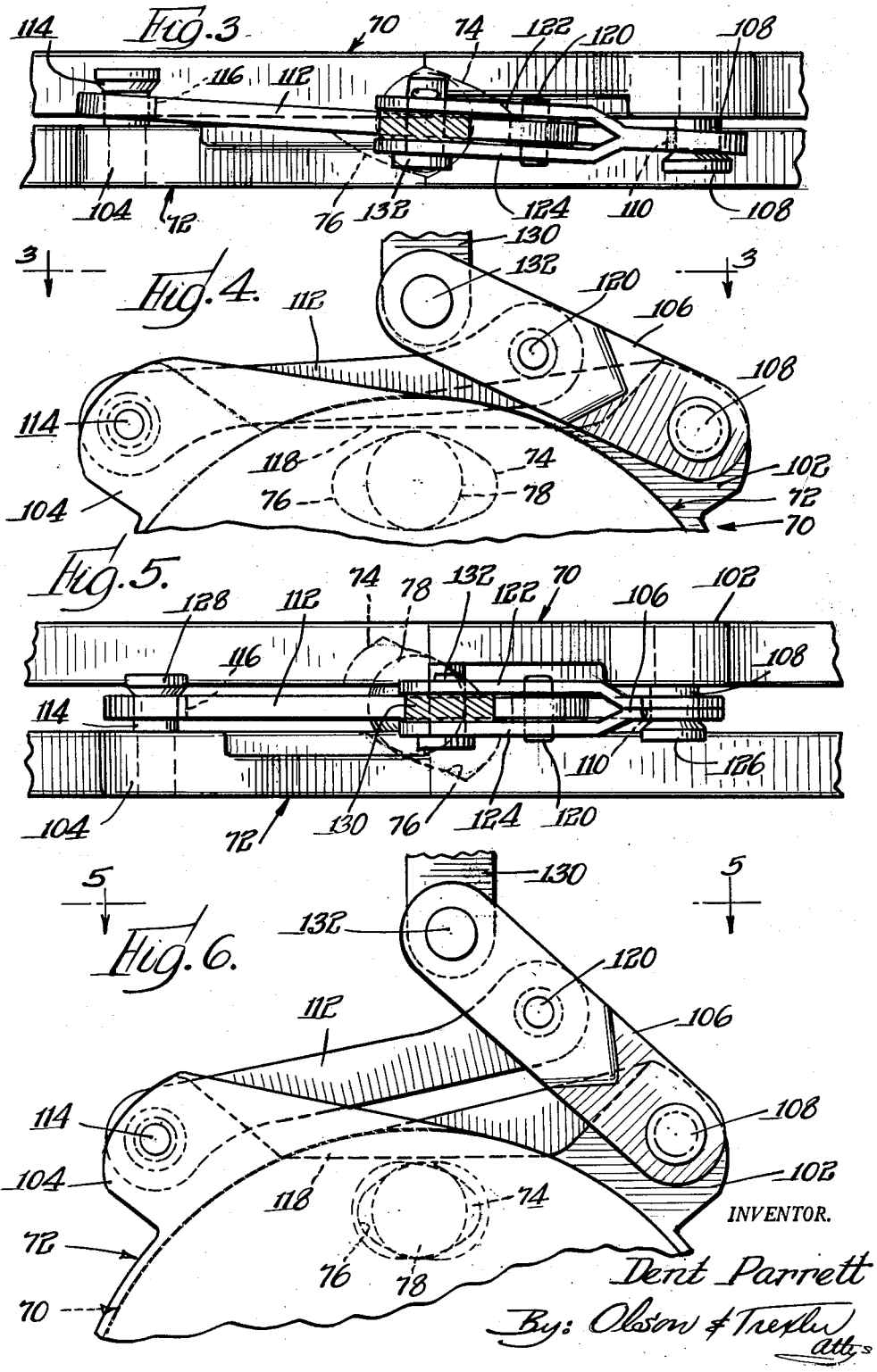

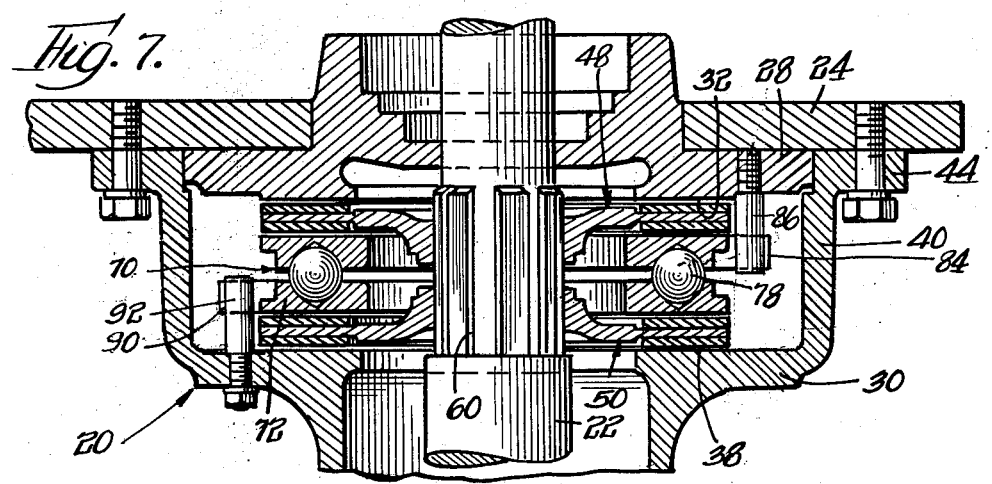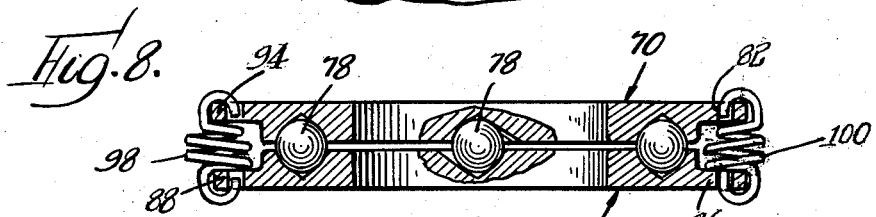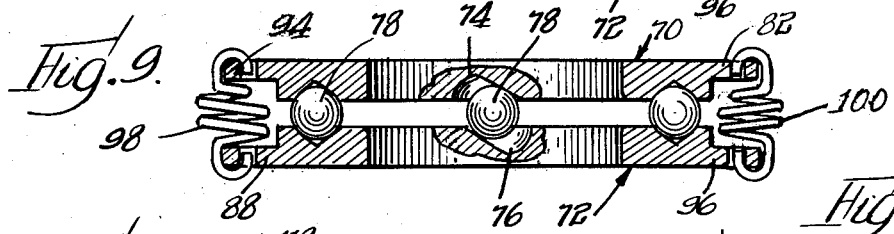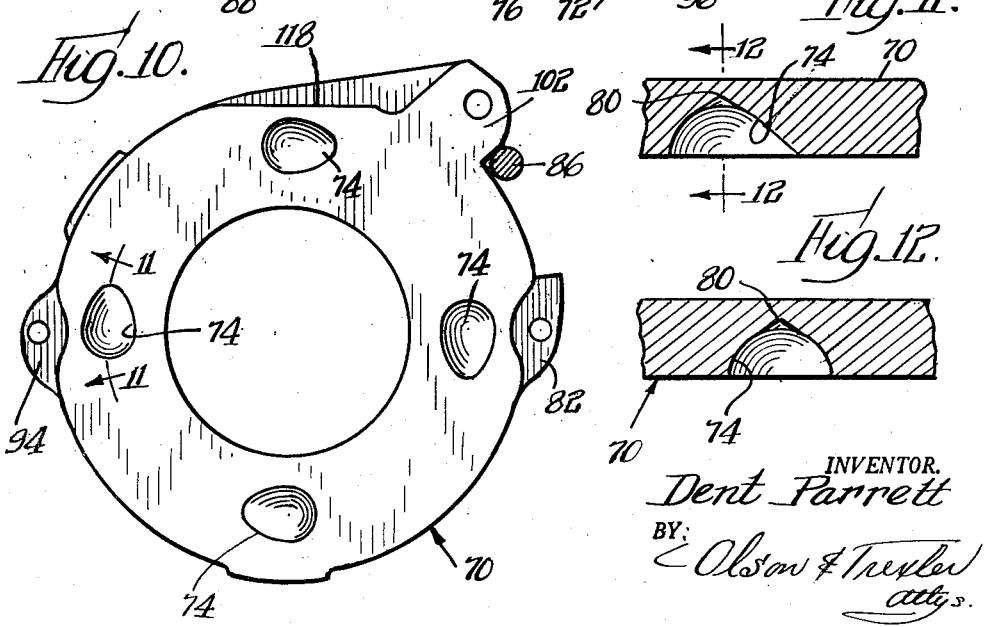

3,101,813
DISC TYPE BRAKE STRUCTURE
Dent Parrett, St. Joseph, Mich., assignor, by mesne assignments, to Lambert Brake Corporation, St. Joseph, Mich., a corporation of Michigan
Filed Apr. 8, 1960, Ser. No. 21,020
6 Claims. (Cl. 188—73)

The present invention relates to a novel brake structure, and more particularly, to a novel disc type brake structure.

Disc brake structures of the general type contemplated herein have heretofore been proposed for various installations and particularly for use in vehicles such as tractors, airplanes, automobiles and the like. Brake structures constructed in accordance with certain of applicant's earlier inventions have been widely used and have in general, been satsifactory in operation. However the present invention contemplates an improved structure whereby the braking action may be increased to a substantial and significant degree.

An important object of the present invention is to provide the novel disc type brake structure whereby the braking action may be substantially increased in a simple, efficient and economical manner.

Another important object of the present invention is to provide a novel disc type braking structure adapted to provide a substantially improved braking action and also constructed so that it may be readily substituted for generally similar braking structures now in use without requiring substantial or expensive modifications of the apparatus in which the brake structure is to be installed.

A more specific object of the present invention is to provide a novel disc type brake structure which is of simplified and more rugged construction and which is adapted to promote more uniform braking action and an increased operating life. Other objects and advantages of the present invention will become apparent from the following description wherein:

FIG. 1 is a sectional view taken along line 1—1 in FIG. 2, showing a disc type brake structure incorporating features of the present invention;

FIG. 2 is a partial sectional view taken along line 2—2 in FIG. 1;

FIG. 3 is a fragmentary sectional view taken along line 3—3 in FIG. 4;

FIG. 4 is an enlarged fragmentary side elevational view showing the brake actuating linkage means which is constructed in accordance with the features of the present invention;

FIG. 5 is a fragmentary sectional view taken along line 5—5 in FIG. 6;

FIG. 6 is a fragmentary side elevational view similar to FIG. 4 but shows the linkage means in an extended and brake actuating condition;

FIG. 7 is a partial sectional view taken generally along line 7—7 in FIG. 1;

FIG. 8 is a partial sectional view taken along line 8—8 in FIG. 1 and further broken away to show a portion of the structure in greater detail;

FIG. 9 is similar to FIG. 8 but shows the elements in an actuated or brake-applying condition;

FIG. 10 is a side elevational view showing one of a pair of actuating discs included in the brake structure of the present invention;

FIG. 11 is an enlarged fragmentary sectional view taken along line 11—11 in FIG. 10; and FIG. 12 is a fragmentary sectional view taken along line 12—12 in FIG. 11.

Referring now more specifically to the drawings wherein like parts are designated by the same numerals throughout the various figures, a brake structure 20 incorporating features of the present invention is shown in FIGS. 1, 2 and 7 in association with a shaft 22 which is to be controlled by the brake structure. It will be appreciated that the shaft 22 may be a part of many different types of apparatus or vehicles in which the brake structure is to be installed. By way of example only, it is noted that the shaft 22 may be a tractor countershaft.

The rotatable shaft 22 which is supported and driven by suitable means, not shown, extends through an opening in a fixed wall or frame member 24 which forms a part of the apparatus or vehicle. The brake structure comprises housing means 26 fixed with respect to the wall or frame member 24 and an annular member 28 also fixed to the wall or frame member 24 by means of a plurality of screws 30 and presenting a finished annular friction or braking surface 32. The housing means comprises a complementary hollow or bell-like member 34 having an annular end wall 36 presenting a finished annular frictional braking surface 38 axially offset from and aligned with and opposed to the surface 32. The member 34 also comprises a cylindrical side wall 40 which traverses the space 42 between the opposing friction surfaces 32 and 38, which cylindrical wall terminates in an end flange 44 which abuts the frame member 34 and is secured thereto by means of a plurality of screws 46.

Disposed within the housing means are first and second friction disc assemblies 48 and 50 respectively disposed adjacent the friction surfaces 32 and 38. The disc assembly 48 comprises a central annular metal disc 52 having annular bodies 54 and 56 of a desired composition or friction material secured to opposite sides of its peripheral portion. An inner marginal portion 58 of the disc member 52 is provided with teeth cooperable with a splined portion 60 of the shaft 22 so that the disc assembly 48 is fixed against rotation relative to the shaft but is adapted to be shifted axially of the shaft during a braking operation.

The disc assembly 50 is substantially identical to but oppositely disposed from the disc assembly 48. Thus the disc assembly 50 includes a central metal disc 62 having an inner margin 64 formed with suitable teeth cooperable with the axially elongated splines on the shaft 22 so that the disc 62 is nonrotatably but axially shiftably disposed on the shaft. Annular bodies 66 and 68 of composition or frictional material are secured to opposite sides of an outer marginal portion of the disc 62.

In order to force the friction disc assemblies against their respective cooperable braking surfaces 32 and 38 of the housing means, a pair of actuating discs 70 and 72 is disposed between the friction disc assemblies. The actuating discs which are constructed in accordance with features of the present invention described more fully below, are provided with cam means therebetween in the form of cam seats 74 and 76 respectively provided on these discs and ball elements 78 between the seats, which cam means serve to force the actuating discs axially apart when the discs are rotated relative to each other in the manner to be described for thereby forcing friction disc assemblies against the braking surfaces on the housing means. In the embodiment shown, the actuating discs are provided with four equally spaced cam surfaces or ball seats for accommodating four ball elements.

As shown best in FIGS. 8–12, each of the cam surfaces or ball seats is in the form of an elongated arcuate groove of varying depth and having a transverse curvature with a diameter substantially equal to the diameter of the ball elements. It has been found that these cam surfaces or ball seats may be accurately and economically formed integral with the remainder of the actuating discs. It will be appreciated that the cam surfaces or ball seats must be accurately and uniformly made so as to prevent tilting of the actuating discs relative to each other or the central axis of the brake structure, which tilting would cause improper and inefficient braking action. Furthermore, any dust or other foreign material which may collect in the cam surfaces or ball seats might, in effect, detract from the accuracy of the finish of the ball seats. Therefore, these seats are provided with pocket areas 80, shown best in FIGS. 11 and 12, which are at the lower ends of the seats and are outside of the diameter of the ball elements. These pockets are adapted to accommodate dust or other foreign material which may gravitate into the seats so that such foreign material will not interfere with the proper operation of the brake structure.

As shown in FIGS. 1, 7 and 10, the actuating discs 70 and 72 are held in position in relation to the housing 26 and friction plate 28 by means of torque pins 86 and 92 respectively. In the adaptation shown in FIG. 7, torque pin 86 is mounted in friction plate 28 and torque pin 92 is mounted in housing 26. However, if desired, pins 86 and 92 may both be mounted in either friction plate 28 or housing 26. Torque pins 86 and 92 are positioned in relation to the actuating discs 70 and 72 to that they abut radially extending ears 102 and 104 of said actuating discs. Actuating discs 70 and 72 are also provided with lugs 82 and 88 respectively. Lugs 82 and 88 are provided with abutment surfaces 84 and 90 respectively, said surfaces serving as stop means against torque pins 86 and 92 when the friction elements of the friction disc assembly 48 and 50 reach their full worn position, their purpose being to prevent physical damage to the brake. With this arrangement the actuating disc 70 is positively limited against rotation relative to the housing in a clockwise direction, as viewed in FIGS. 1 and 10 and the disc 72 is similarly positively limited against rotation relative to the housing in a counterclockwise direction. However, the disc 70 may be rotated in a counterclockwise direction and the disc 72 may be similarly rotated in a clockwise direction during a braking operation, as will be described more fully below.

The actuating discs 70 and 72 are respectively provided with additional lugs 94 and 96 which are respectively disposed in opposing relationship to the above mentioned lugs 88 and 82. Springs 98 and 100 extend between the paired lugs for drawing the actuating discs toward each other to the retracted nonbraking position shown in FIGS. 1–4, 7 and 8.

In order to rotate the actuating discs in opposite directions relative to each other for energizing the brake structure, linkage means constructed in accordance with a feature of the present invention and shown in FIGS. 1–6 is provided. More specifically, the disc 70 is provided with the above mentioned radially extending ear 102 which, it will be noted, is substantially fully as thick as the remainder of the disc so that it has maximum strength and ruggedness. The disc 72 is provided with the above mentioned ear 104 which is essentially identical to the apertured ear 102. These ears when the discs 70 and 72 are positively located by their associated stop pins 86 and 92, are substantially equally circumferentially and oppositely offset from a radially extending plane containing the central axis of the discs. A first link 106 is pivotally connected to the ear 102 by a pivot 108 which extends through an oversized aperture 110 in an end portion of the link. When the linkage mechanism is in a retracted or non-energizing position, as shown best in FIGS. 3 and 4, the link 106 extends substantially tangentially to the periphery of the discs so that an end portion thereof opposite from the pivot pin 108 is spaced laterally outwardly from the periphery of the discs and is located substantially at the above mentioned plane.

The linkage means includes a second link 112 having one end pivotally connected to the ear 104 of the disc 72 by a pivot pin 114 which extends through an oversized aperture 116 in the link. The peripheries of the actuating discs are relieved as indicated at 118 in FIGS. 1, 4, 6 and 10 for enabling the link 112 to extend directly toward the link 106 and beneath the outer end portion of the link 106 for connection to an intermediate portion of the link 106 by means of pivot pin 120 having an enlarged center section acting like a spacer between the opposite arms of the two piece link 106. It is to be noted that this arrangement is extremely compact so that no enlargement or undue alteration need be made in the housing means which would prevent the brake structure of the present invention from being substituted for generally similar brake structures heretofore in use. At the same time, it is also to be noted that this linkage construction enables the forces with which the friction discs are clamped against the friction surfaces of the housing in response to a given pressure manually applied to an actuating foot pedal, lever or the like to be increased between about 35% and 58% as compared with corresponding forces in generally similar disc type brake structures heretofore in use. Preferably the pivot pin 120 is located generally midway between the opposite end portions of the link 106 but slightly closer to the outer end portion as is shown in the drawings.

As indicated above, the lugs or ears 102 and 104 are formed so that they have a thickness substantially equal to the thickness of their respective discs. Thus, they are better able to withstand and accommodate the increased forces which may be applied as the result of the linkage mechanism constructed in accordance with the present invention. Referring particularly to FIGS. 3 and 5 it is seen that the pivot pins 108 and 114 extend in opposite directions from their respective ears and the actuating discs 70 and 72 are quite close together when they are in their retracted positions. As a result the links 106 and 112, when in their retracted positions shown in FIGS. 3 and 4, are disposed in a plane which extends diagonally with respect to the common axis of the discs 70 and 72 and also with respect to the axes of the pivot pins 108 and 114. It will be appreciated that this feature also enhances the compactness of the structure while enabling it to be ruggedly formed for accommodating the contemplated increased forces. In order further to enhance the ruggedness of the structure, the link 106 is bifurcated so as to present spaced apart arm portions 122 and 124 between which the link 112 extends in the manner shown.

When the links are pulled outwardly during a braking operation, as shown in FIGS. 5 and 6, the ears 102 and 104 are pulled toward each other so that the actuating discs are rotated relative to each other in opposite directions for causing the ball elements to ride upon the cam seats and spread the discs apart as shown in FIG. 5, and thereby clamp the friction discs against the braking surfaces of the housing. It will be noted that when the actuating discs are spread apart the links 106 and 112 assume a position in a plane extending perpendicular to the axes of the pivot pins 108 and 114. Thus the links are arranged so as to minimize diagonally directed twisting or bending forces on the pivot pins and the links when the actuating discs are fully spread apart and maximum braking pressures are being applied. Of course when the links are in the diagonal arrangement shown in FIG. 3, there are little or no forces applied thereto. In order to enable the links to swing between the diagonal and perpendicular positions shown in FIGS. 3 and 5, relative to the pivot pins, the pins are provided with enlarged link retaining head portions 126 and 128 spaced outwardly from their associated ears 102 and 104 a distance substantially greater than the thickness of the links, and the above mentioned oversized apertures 110 and 116 are provided with diameters substantially greater than the diameters of the pins.

The linkage means of the brake structure includes another link 130 which is connected with an outer end portion of the link 106 by a pivot pin 132. The link 130, as shown in FIGS. 1 and 2 extends generally radially outwardly to a slot 134 formed in the periphery of the housing. Another link member 136 is joined with an outer end of the link 130 by means of a threaded or other suitable rotary connection 138. The outer end portion of the link 136 is connected by a pivot pin 140 with any suitable means which may be manually or otherwise manipulated for pulling the combined link 130—136 generally radially outwardly and thereby actuating the brake. In the embodiment shown the pivot pin 140 is connected with a lever 142 which is pivotally mounted at one end to a fixed bracket 144 by a pin 146. It will be noted that the rotary connection 138 between the inner and outer end portions of the combined link 130—136 enables the inner end link portion 130 to swing between the diagonal and perpendicular positions of the links 106 and 112 during operation of the brake structure.

A brief résumé of the operation of the brake srtucture will now be given. With the actuating discs 70 and 72 held in the normally retracted position by the springs 98 and 100, the friction disc assemblies are effectively disengaged from both the braking surfaces on the housing and the opposing side surfaces which also function as braking surfaces of the actuating discs. Then when an operator manipulates a suitable brake pedal, hand lever or the like for accomplishing the braking operation, the lever 142 is pivoted in a clockwise direction as shown in FIG. 1 and the link 130—136 is pulled outwardly. As a result the links 106 and 112 are pulled outwardly toward the positions shown in FIGS. 5 and 6 so that the actuating discs are rotated relative to each other and the ball elements ride up on the cam surfaces and spread the discs apart to clamp the friction disc assemblies against the braking surfaces of the housing. Of course, when the operator relieves the braking pressure, the elements of the brake structure return to their normal or retracted positions.

While the preferred embodiment of the present invention has been shown and described herein, it is obvious that many structural details may be changed without departing from the spirit and scope of the appended claims.

The invention is claimed as follows:

1. A brake structure for a rotatable shaft to be controlled comprising a pair of friction disc means nonrotatably mounted on said shaft in axially spaced relationship and axially slidable relative to said shaft, fixed housing means around said disc means and presenting braking surfaces for cooperative engagement with said friction disc means, first and second axially shiftable actuating discs surrounding said shaft between said friction disc means, means between said actuating discs for spreading the actuating discs upon relative rotation thereof in predetermined opposite directions for clamping said friction disc means against said cooperative braking surface means, and first and second links respectively having first end portions pivotally connected to said first actuating disc and said second actuating disc at points offset from each other circumferentially of said actuating discs, said links extending generally toward each other, said second link having a second end portion pivotally connected to an intermediate portion of said first link, said first link having a second end portion spaced outwardly from said intermediate portion and connectable means for shifting said last mentioned link end portion outwardly for relatively rotating said actuating discs for actuating the brake structure, and first and second pivot pins respectively secured to said first and second actuating discs and extending over the adjacent actuating discs, said pivot pins providing the pivot connections between said first and second links and said first and second actuating discs respectively, said first and second links having a combined transverse dimension greater than a normal space between said pair of actuating discs when the actuating discs and the links are in retracted positions, said first and second links extending diagonally with respect to said pivot pins when the links are in retracted positions and substantially perpendicular with respect to said pivot pins when the links are pulled outwardly during a braking operation, said pivot pins having a length greater than a thickness of said links, and said links having oversized apertures receiving the pivot pins for enabling the links to move between said diagonal and substantially perpendicular arrangements with respect to the pivot pins.

2. A brake structure for association with a shaft comprising a pair of friction discs nonrotatably and axially shiftably mounted on said shaft, housing means around said friction discs presenting radially extending braking surface means for cooperative engagement with said friction discs, first and second axially shiftable actuating discs surrounding said shaft between said friction discs, cam means between said actuating discs for spreading said actuating discs upon relative rotation of said actuating discs in predetermined opposite directions for initiating the braking operation, a first link having a first end portion pivotally connected to said first actuating disc at a predetermined first pivot point, said first link normally extending from said pivot point in one direction generally toward and close to and beyond peripheries of said actuating discs, said first link having a second end portion opposite from said first end portion radially spaced from the peripheries of said actuating discs, a second link having a first end portion pivotally connected to said second actuating disc at a second pivot point offset from said first pivot point generally in said one direction circumferentially of said actuating discs, said second link also being pivotally connected to said first link at a point between the opposite end portions of said first link, said outwardly disposed second end portion of said first link being disposed between said first and second pivot points and being connectable to an element adapted to be operated for shifting said second end portion outwardly for rotating and spreading said actuating discs, said actuating discs having a predetermined thickness and outwardly projecting apertured ears of about the same thickness, first and second pivot pins respectively connected to said ears of said first and second actuating discs and pivotally connecting said first and second links to said ears of said first and second actuating discs, said links having a combined thickness greater than a normal space between said actuating discs when the actuating discs are in retracted positions, said pivot pins extending from their associated ears in opposite directions and over the adjacent actuating discs, said links initially extending diagonally between said pivot pins when said actuating discs are in retracted positions and then moving toward positions substantially perpendicular to said pins when said actuating discs are spread apart during a braking operation.

3. A brake structure, as defined in claim 2, wherein said first and second links include oversized aperture means receiving said first and second pivot pins respectively for enabling said links to move between positions extending generally diagonally of and substantially perpendicular to said pins during a braking operation.

4. A brake structure, as defined in claim 2, wherein said first link is bifurcated from a point adjacent said first end portion and presents a pair of spaced apart arms, said second link extending between and being pivotally connected to said spaced apart arms.

5. A brake structure, as defined in claim 2, wherein said cam means between said actuating discs comprises arcuately elongated cam surfaces integrally formed with said actuating discs, said cam surfaces progressively increasing in depth and having an arcuate transverse cross-section having a curvature of predetermined radius, the cam surfaces on said first and second actuating discs being paired with each other and oppositely disposed, and ball elements having a radius substantially equal said predetermined radius disposed between each pair of opposed cam surfaces.

6. A brake structure, as defined in claim 5, wherein each of said cam surfaces is provided with a pocket at its lower end and disposed outwardly of the curvature of said transverse cross section for accommodating any foreign material.

References Cited in the file of this patent

UNITED STATES PATENTS

| | | |
|---|---|---|
| 1,616,659 | Heany | Feb. 8, 1927 |
| 2,057,422 | Dickson | Oct. 13, 1936 |
| 2,387,039 | Parrett | Oct. 16, 1945 |
| 2,883,007 | Klaue | Apr. 21, 1959 |

FOREIGN PATENTS

| | | |
|---|---|---|
| 887,277 | France | Aug. 9, 1943 |